United States Patent
Chen et al.

(10) Patent No.: US 9,552,474 B2
(45) Date of Patent: Jan. 24, 2017

(54) METHOD AND COMPUTER SYSTEM FOR DYNAMICALLY PROVIDING MULTI-DIMENSIONAL BASED PASSWORD/CHALLENGE AUTHENTICATION

(71) Applicant: GLOBALFOUNDRIES INC., Grand Cayman (KY)

(72) Inventors: David S. C. Chen, Taipei (TW); Richard Tung, Flushing, NY (US); Boyi Tzen, Taipei (TW); Der-Joung Wang, Taipei (TW)

(73) Assignee: GLOBALFOUNDRIES INC., Grand Cayman (KY)

( * ) Notice: Subject to any disclaimer, the term of this patent is extended or adjusted under 35 U.S.C. 154(b) by 114 days.

(21) Appl. No.: 14/521,795

(22) Filed: Oct. 23, 2014

(65) Prior Publication Data

US 2015/0121493 A1 Apr. 30, 2015

(30) Foreign Application Priority Data

Oct. 31, 2013 (TW) .............................. 102139714 A

(51) Int. Cl.
G06F 21/36 (2013.01)
G06F 21/46 (2013.01)
H04L 29/06 (2006.01)

(52) U.S. Cl.
CPC .............. *G06F 21/36* (2013.01); *G06F 21/46* (2013.01); *H04L 63/083* (2013.01); *H04L 29/06* (2013.01)

(58) Field of Classification Search
USPC ............................................ 726/2; 715/702
See application file for complete search history.

(56) References Cited

U.S. PATENT DOCUMENTS

| 8,127,254 B2 | 2/2012 | Lindberg et al. |
| 8,286,103 B2 | 10/2012 | Chaudhri et al. |
| 2006/0075250 A1 | 4/2006 | Liao |

(Continued)

FOREIGN PATENT DOCUMENTS

| CN | 101882193 A | 11/2010 |
| CN | 101882046 B | 10/2012 |

(Continued)

OTHER PUBLICATIONS

Shin, K.I. et al., "Design and Implementation of Improved Authentication System for Android Smartphone Users," In 26th Int'l. Conf. on Advanced Information Networking and Applications Workshops, pp. 704-707, IEEE 2012, 4 pg.

"Two-Factor Access Code Based on Characters and Pressure," [online] IP.com Prior Art Database, Disclosure No. IPCOM000210046D, Aug. 23, 2011, retrieved from the Internet: <http://priorart.ip.com/IPCOM/000210046>,1 pg.

(Continued)

*Primary Examiner* — Jeffrey Pwu
*Assistant Examiner* — Samuel Ambaye
(74) *Attorney, Agent, or Firm* — Yuanmin Cai; Hoffman Warnick LLC

(57) ABSTRACT

Providing multi-dimensional password/challenge authentication for a computer device includes, in response to a login request, sending a login webpage, the webpage at least comprising a set of randomly generated icons with graphical attributes for sequentially selecting; and, determining whether each icon choice entered by a user complies with at least a dimensional option preset for each digit of a preset password according to at least a dimensional option of the digit.

15 Claims, 7 Drawing Sheets

(56) References Cited

U.S. PATENT DOCUMENTS

| | | | | |
|---|---|---|---|---|
| 2008/0244700 | A1* | 10/2008 | Osborn | G06F 21/36 726/2 |
| 2009/0038006 | A1* | 2/2009 | Traenkenschuh | G06F 21/36 726/21 |
| 2010/0099394 | A1 | 4/2010 | Hainzl | |
| 2012/0291123 | A1 | 11/2012 | Qian et al. | |

FOREIGN PATENT DOCUMENTS

| | | |
|---|---|---|
| CN | 101779211 B | 12/2012 |
| CN | 102880398 A | 1/2013 |
| CN | 102945118 A | 2/2013 |
| EP | 2381384 A1 | 4/2010 |
| EP | 2256610 A1 | 12/2010 |
| TW | 201101086 A | 1/2011 |
| TW | 201235930 A | 9/2012 |

OTHER PUBLICATIONS

"Method and System for Enabling a User to Provide Gesture based Password for a Mobile Device," [online] IP.com Prior Art Database, Disclosure No. IPCOM000214188D, Jan. 16, 2012, retrieved from the Internet: <http://priorart.ip.com/IPCOM/000214188>, 1 pg.

"System and Method to Unlock Screen Based on Finger Pressure," [online] IP.com Prior Art Database, Disclosure No. IPCOM000220614D, Aug. 9, 2012, retrieved from the Internet: <http://priorart.ip.com/IPCOM/000220614>, 1 pg.

Rodriguez, J.R. et al., "IBM WebSphere DataPower SOA Appliances, Part IV: Management and Governance," [online] IBM Corporation REDP-4366-00., <http://www.redbooks.ibm.com/redpapers/pdfs/redp4366.pdf>, 148 pg.

"Random String Generator," [online] Random.org © 1998-2014 [retrieved Oct. 22, 2014] retrieved from the Internet: <http://www.random.org/strings/>, 1 og.

* cited by examiner

METHOD AND COMPUTER SYSTEM FOR DYNAMICALLY PROVIDING MULTI-DIMENSIONAL BASED PASSWORD/CHALLENGE AUTHENTICATION

CROSS-REFERENCE TO RELATED APPLICATIONS

This application claims the benefit of Taiwan Patent Application Number 102139714 filed on Oct. 31, 2013, which is fully incorporated herein by reference.

BACKGROUND

Daily life requires the use of a wide variety of information devices, such as mobile phones, personal computers, notebook computers, and tablet computers. The information devices may keep users' personal data and identity data. Due to the prevalence of networks, an increasing number of network functions are performed on-line. In particular, servers have to store users' personal data and identity data in order to provide network services, such as social networking services, webpage/email services, mobile commerce services, banking on-line transaction services, database access services, or content and information provider services. Hence, to ensure security and privacy, the servers usually require that, before accessing the services provided by the servers, users have to follow an authentication procedure for recognizing the users' identity. At present, the most common authentication procedure is a password-based challenge authentication procedure whereby a server typically requires that, before accessing its services, users ought to enter a username and a password for identity recognition (or known as "login"), in order to prevent user personal data from being stolen or fraudulently changed.

With network coverage and accessibility increasing rapidly, hackers are becoming more likely to target a user's password with a view to faking the user's identity. Therefore, simple passwords no longer provide adequate protection. In view of this, various mechanisms are put forth to provide better protection. For example, users are required to create a password that meets the requirements of password length, complexity, and unpredictability, such that the strength of the password is sufficient to fend off brute-force search attacks and dictionary attacks. Furthermore, users are required to change their passwords regularly to invalidate old passwords, thereby reducing the chance that their passwords will be cracked. The aforesaid mechanisms enhance security and thus help users protect their accounts.

However, users usually seek Web-based access to various Websites for various online services through a username/password authentication process and challenges. In practice, most users log in to different Websites with different usernames and passwords. The aforesaid mechanisms require the users to memorize multiple passwords for accessing online services offered by various Websites. Users often log in to just a small number of Websites daily and thus seldom correctly remember the passwords of infrequently visited Websites.

Some authentication mechanisms dispense with usernames but require users to enter a password for obtaining access authority, for example, entering a passcode, a PIN, or a power-on password into a cell phone or a mobile device (such as an iPad or a tablet) in order to unlock the cell phone or the mobile device. The passcode usually consists of a set of numbers. The password is formed from a combination of a set of letters and numbers and thus provides a higher security level than the passcode which contains just a set of numbers. In practice, the security levels provided by the aforesaid mechanisms are unsatisfactory because the mobile devices are usually intended for use in public spaces. As a result, onlookers or unauthorized persons beside a mobile device user can see and memorize a passcode or password being entered into the mobile device by the user while the user is unlocking the mobile device.

SUMMARY

A method for dynamically providing multi-dimensional password/challenge authentication may include sending a login webpage in response to receipt of a login request, wherein the login webpage comprises a set of randomly generated icons with graphical attributes, and the icons are available for sequential selection. The method also may include determining, using a processor, whether each icon choice entered by a user complies with at least a dimensional option preset for each digit of a preset password according to at least a dimensional option of the digit.

A method for providing registration of multi-dimensional password/challenge authentication may include sending a registration webpage in response to receipt of a registration request, wherein the registration webpage comprises a plurality of dimensional options at least one of which is preset for each digit of a password by a user, and the digits function as icons which have graphical attributes. The method may include recording, using a processor, at least a dimensional option preset for each digit of the password by the user.

A computer system for dynamically providing multi-dimensional password/challenge authentication may include a bus system, a memory connected to the bus system, wherein the memory comprises a set of instructions, and a processing unit connected to the bus system. The processing unit executes the set of instructions to initiate operations. The operations include sending a login webpage in response to receipt of a login request, wherein the login webpage comprises a set of randomly generated icons with graphical attributes, and the icons are available for sequential selection. The operations also may include determining whether each icon choice entered by a user complies with at least a dimensional option preset for each digit of a preset password according to at least a dimensional option of the digit.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION

Figure 1:
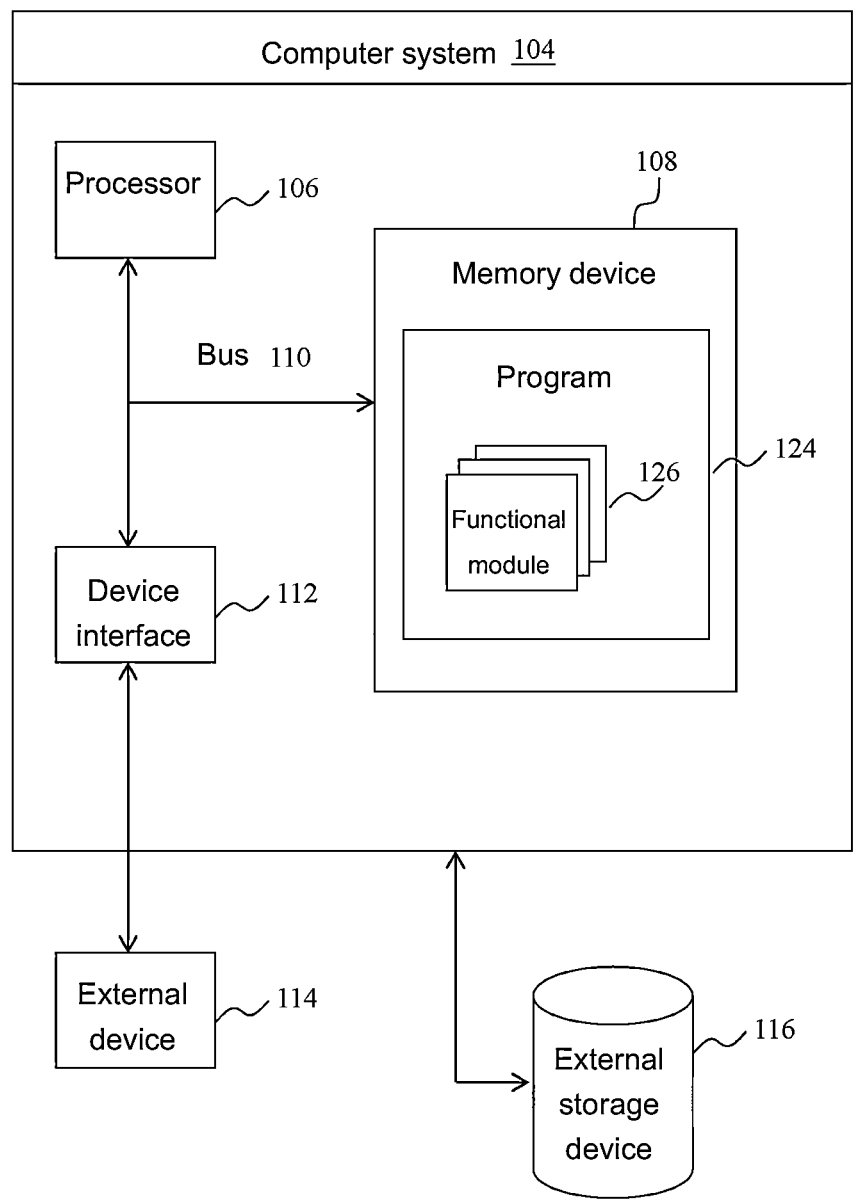
FIG. 1 is a schematic view of the hardware architecture of a computer system according to an illustrative embodiment of the present invention.

The present invention relates to providing a mechanism for password-based challenge authentication, and more particularly, to a method for dynamically providing multi-dimensional password/challenge authentication and a computer system using the method.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiments of the present invention provide a novel and secure password-based challenge mechanism for identifying users, enabling the users to access intended services, and unlocking the users' mobile devices. In a specific embodiment of the present invention, no fixed password is required, but icons (such as animal icons, fruit icons, number icons, and shape icons) with various graphical attributes (such as color, grayscale, hatching, screen dot, and shape) are "randomly" provided in each instance of a challenge, wherein the icons are associated with a set of grids and are available for sequential selection by the users. Therefore, what the users enter is a sequential digit, and each entered digit serves as an icon with various graphical attributes. Each icon carries at least a graphical attribute, and thus it is regarded as multi-dimensional. The password-based challenge module or mechanism of the present invention examines and determines whether each icon choice entered by the users complies with restrictions of dimensional options preset for each digit entered by the users. If all the icon choices entered by the users comply with the restrictions of dimensional options preset for each digit entered by the users, it will mean that the unlocking or login is done. The users increase the length of each entered digit preset with at least a dimensional option so as to raise the security level. Therefore, the embodiments of the present invention provide a password tailored to user preferences, and prevents onlookers beside the users from memorizing the passwords pried by the onlookers.

In an embodiment, disclosed is a method for dynamically providing multi-dimensional password/challenge authentication, the method comprising the steps of: sending a login webpage in response to receipt of a login request, wherein the login webpage comprises a set of randomly generated icons with various graphical attributes, and the icons are available for sequential selection; and determining whether each icon choice entered by a user complies with at least a dimensional option preset for each digit of a preset password according to at least a dimensional option of the digit. In another embodiment, disclosed is a method for providing registration of multi-dimensional password/challenge authentication, the method comprising the steps of: sending a registration webpage in response to receipt of a registration request, wherein the registration webpage comprises a plurality of dimensional options at least one of which is preset for each digit of a password by a user, and the digits function as icons which have various graphical attributes; and recording at least a dimensional option preset for each digit of the password by the user.

In yet another embodiment, disclosed is a computer system for dynamically providing multi-dimensional password/challenge authentication, the computer system comprising:

a host computer, comprising:

a bus system;

a memory connected to the bus system, wherein the memory comprises a set of instructions; and a processing unit connected to the bus system, wherein the processing unit executes the set of instructions, so as to execute the any one of aforementioned methods.

The following description, the appended claims, and the embodiments of the present invention further illustrate the features and advantages of the present invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 2 through FIG. 5B, computer devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Hardware Environment
System Architecture

FIG. 1 is a schematic view of the hardware architecture of a computer system 104 according to an illustrative embodiment of the present invention. The computer system 104 comprises at least a processor or processing unit 106, a memory device 108, a bus 110 connected to various system components (including the processing unit 106 and the memory device 108), and a device interface 112.

The memory device 108 comprises a volatile memory, such as a random-access memory (RAM) and/or a cache memory. The memory device 108 further comprises removable/non-removable or volatile/non-volatile storage media, such as a non-removable non-volatile hard disk drive (not shown), and a removable non-volatile floppy disk drive, optical disk drive (such as CD-ROM, DVD-ROM, or any other optical storage medium), USB flash drive, and memory card. Each drive is connected to the bus 110 through at least a data medium interface.

The processor 106 accesses program code, for example, a program 124, stored in the memory device 108 or an external storage device 116. The program 124 has at least a functional module 126, including but not limited to an operating system, applications of required functions and/or methods according to the present invention (which are illustrated in FIG. 2 through FIG. 5B and described later), and any other program modules and program data. Each, or a combination, of the functional modules 126 operates in a network environment. Applications which provide required functions and/or methods according to embodiments of the present invention each comprise a password-based challenge module. The password-based challenge module comprises a program module and instructions for identifying users. The functional modules 126 each include a single instruction or a plurality of instructions. The functional modules 126 are disposed on a plurality of program code segments, programs, and multiple memory devices 108.

The functional modules 126, which provide required functions and/or methods according to embodiments of the present invention, come in the form of modules within applications or are provided in the form of a daemon. However, in another embodiment, the functional modules 126 come in the form of programs of the other types. The functional modules 126 include program code for executing the processes illustrated in FIG. 2 through FIG. 5B and described below.

The bus 110 features one or more bus structures (including a memory bus, a peripheral bus, an accelerated graphics port (AGP), and a processor or a local bus which has any one of the bus architectures). The bus architectures include but are not limited to Industry Standard Architecture (ISA) bus, Micro Channel Architecture (MCA) bus, enhanced ISA bus, Video Electronics Standards Association (VESA) local bus, and Peripheral Component Interconnect (PCI) bus.

The bus 110 functions as a communication link of various components in the computer system 104. The computer system 104 communicates with an external device 114 via the device interface 112. Furthermore, the computer system 104 communicates with the external device 114, the external storage device 116, or other computer devices/systems via a network. In this regard, the network can also come in the form of any type of connection, including a wide area network (WAN) or a local area network (LAN) of fixed connection, or dial-up Internet access service offered by an Internet service provider, and it is not restricted to wired or wireless connections. Furthermore, other hardware and software components (not shown, including additional computer systems, routers, and firewalls) can be included in the network.

In another embodiment, from the perspective of its basic architecture and components, the computer system 104 comes in the form of a general-purpose computer device, such as a personal computer (a desktop computer or a notebook computer), a server, or an appliance, for example, IBM WebSphere Datapower SOA Appliance (www.redbooks.ibm.com) or Tivoli ISS Appliances (wherein IBM, WebSphere, and Tivoli are registered trademarks of International Business Machine in the United States and/or any other countries). Furthermore, the computer system 104 comes in the form of a mobile computation device, such as a smartphone, a tablet, or a personal digital assistant (PDA). A data input module of the smartphone is integrated with a display screen to form a touchscreen whereby users create data or enter instructions.

The hardware elements depicted in the computer system 104 are not intended to be exhaustive, but rather are representative to highlight essential components required by embodiments of the present invention. For instance, the computer system 104 may include alternate memory storage devices such as magnetic cassettes, Digital Versatile Disks (DVDs), Bernoulli cartridges, and the like. These and other variations are intended to be within the spirit and scope of the present invention.

The present invention is further illustrated hereunder with embodiments of the password-based challenge module of the present invention. However, persons skilled in the art understand that the embodiments are not restrictive of the present invention.

Process Flow of Password/Challenge Authentication

Figure 2:
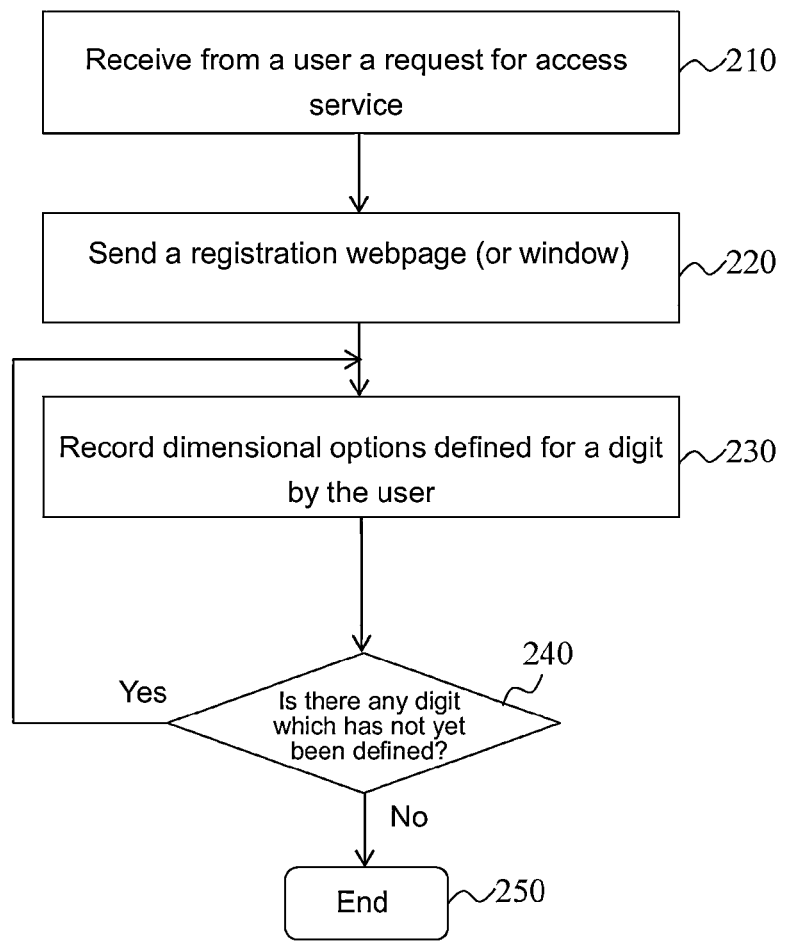
FIG. 2 is a flow chart of a method for the registration of a password/challenge authentication process in a password-based challenge module according to a specific embodiment of the present invention.
Figure 3:
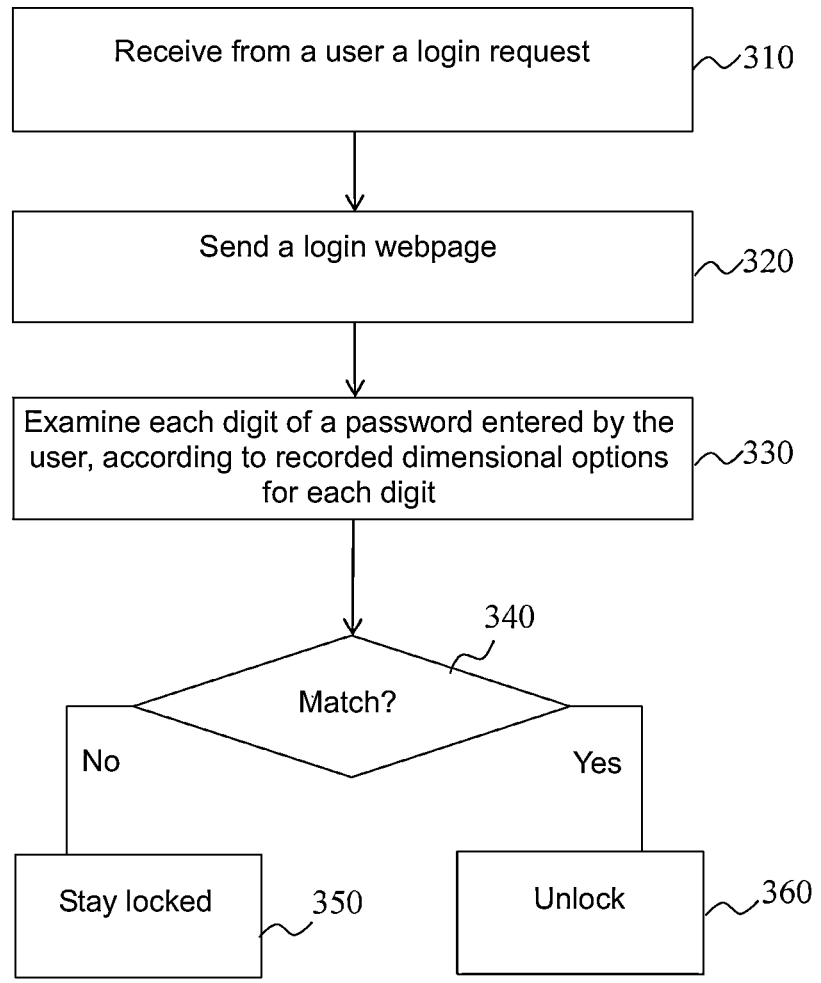
FIG. 3 is a flow chart of a method for the login of the password/challenge authentication process in the password-based challenge module according to a specific embodiment of the present invention.
Figure 4A:
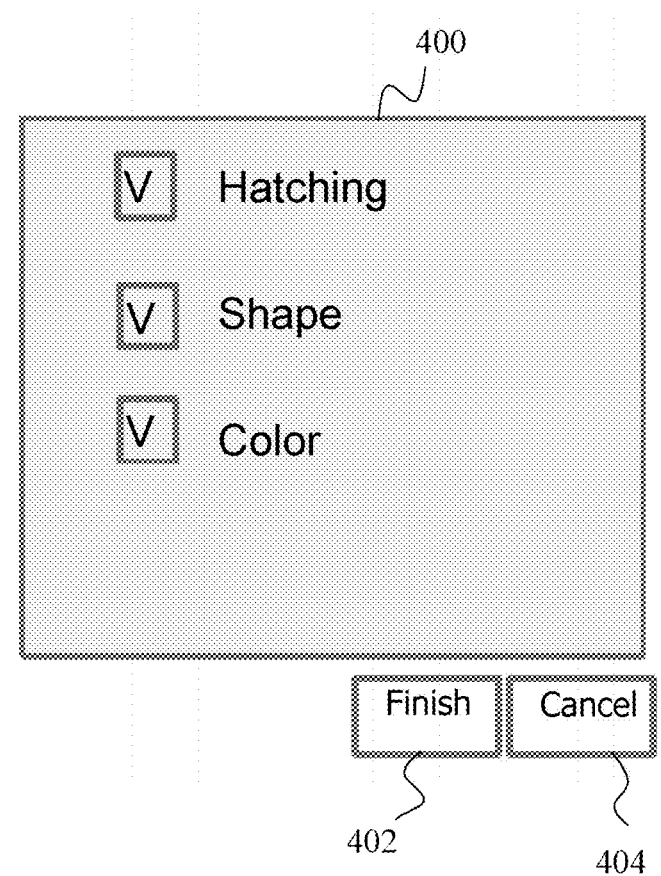
FIG. 4A and FIG. 4B show frames of execution of the registration presented by the computer system in reference to FIG. 2.
Figure 4B:
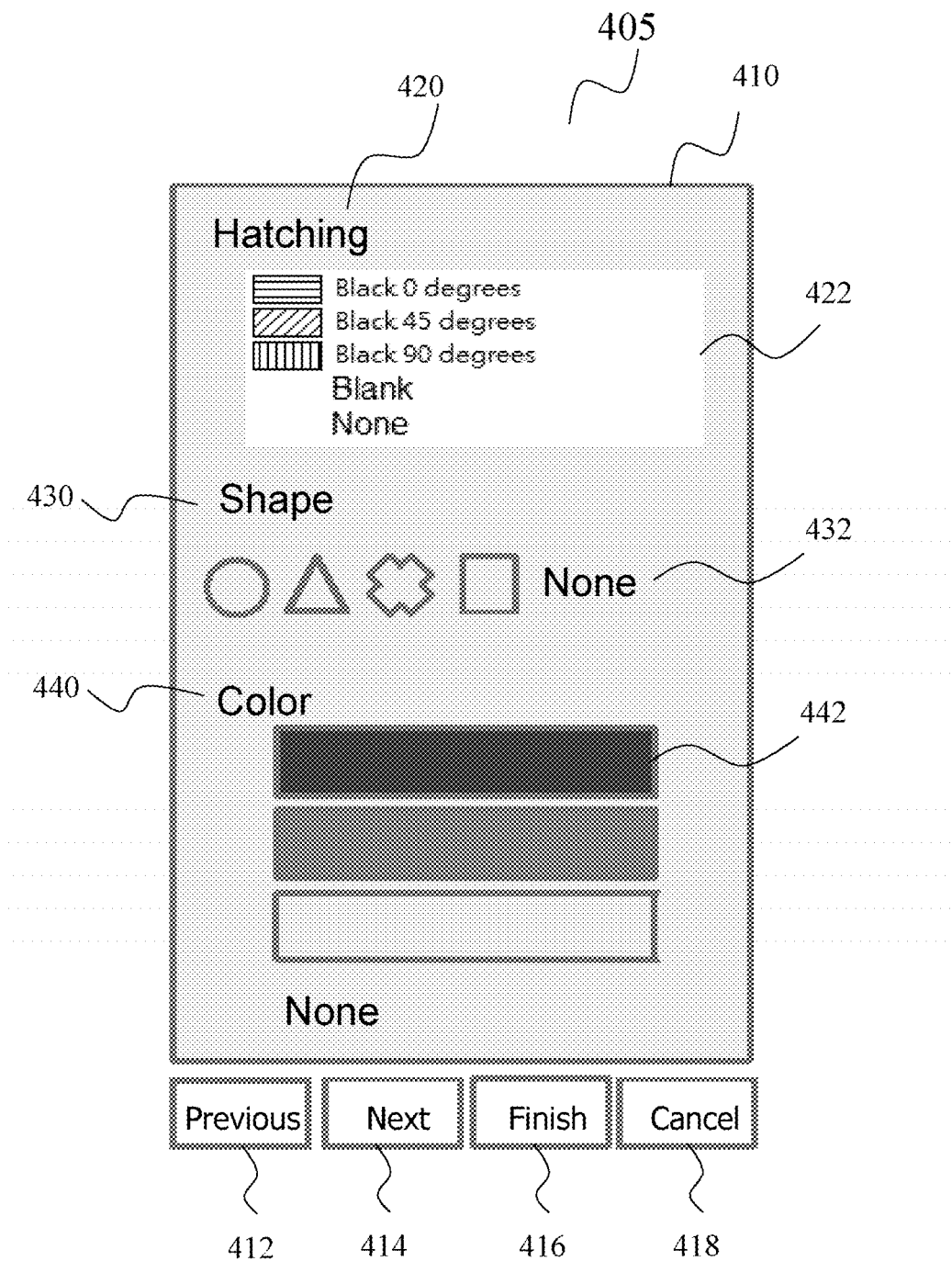

FIG. 2 and FIG. 3 are flow charts of methods for the registration and login of a password/challenge authentication process in a password-based challenge module according to a specific embodiment of the present invention, respectively. FIG. 4A and FIG. 4B show frames of execution of the registration presented by the computer system 104 in reference to FIG. 2 as described below.

Step 210: the computer system 104 receives from a user a request for registration of access service.

Step 220: in response to the request, the computer system 104 sends a registration webpage (or window) whereby the user predefines at least a dimensional option (shown in FIG. 4A and FIG. 4B) for each entered digit of a password. The digits function as icons (such as animal icons, fruit icons, number icons, and shape icons) which have various graphical attributes (such as color, grayscale, hatching, screen dot, and shape) respectively. The icons are not restricted to the aforesaid animal icons, fruit icons, number icons, and shape icons. Whatever distinguishable icons are included in the embodiments of the present invention.

Step 230: at least a dimensional option and particular options thereof preset (or predefined) for a digit of a password by the user are recorded. The user keeps presetting subsequent digits of the password with next button 414 and finish button 416 shown in FIG. 4B.

Step 240: It is determined whether there is any digit which has not yet been defined. The method goes back to step 230 when the determination is affirmative, and goes to step 250 when the determination is negative.

Step 250: end the registration of the password/challenge authentication process.

Figure 5A:
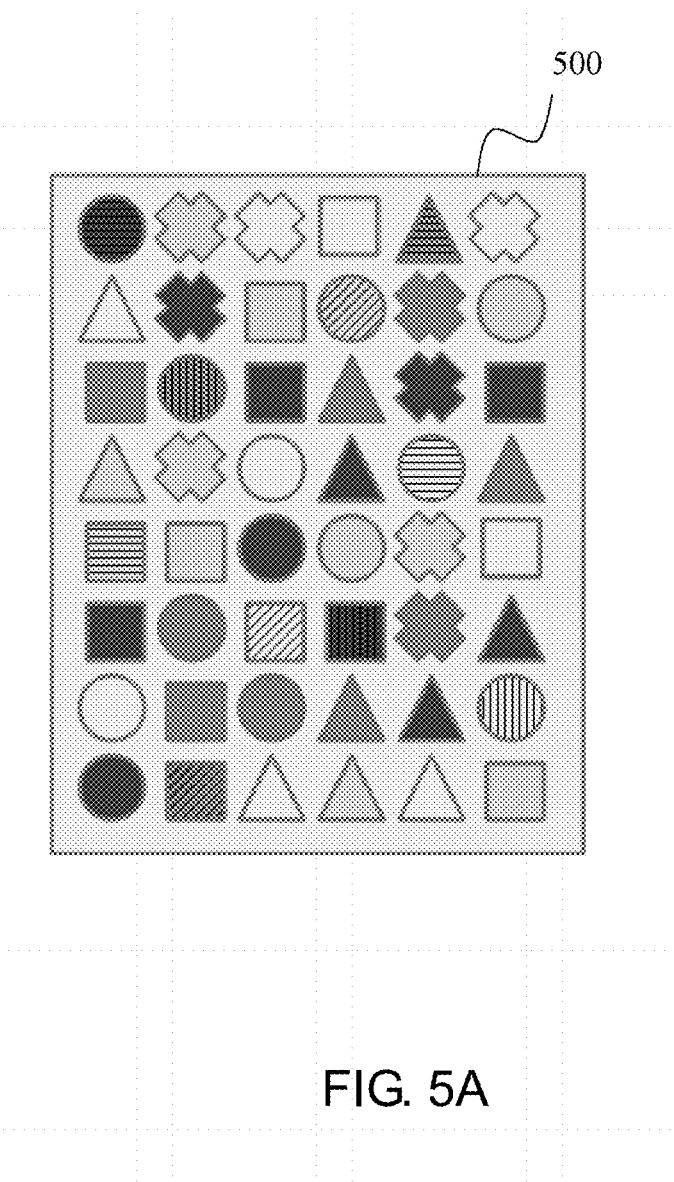
FIG. 5A and FIG. 5B are schematic views illustrative of the login to the computer system in reference to FIG. 3.
Figure 5B:
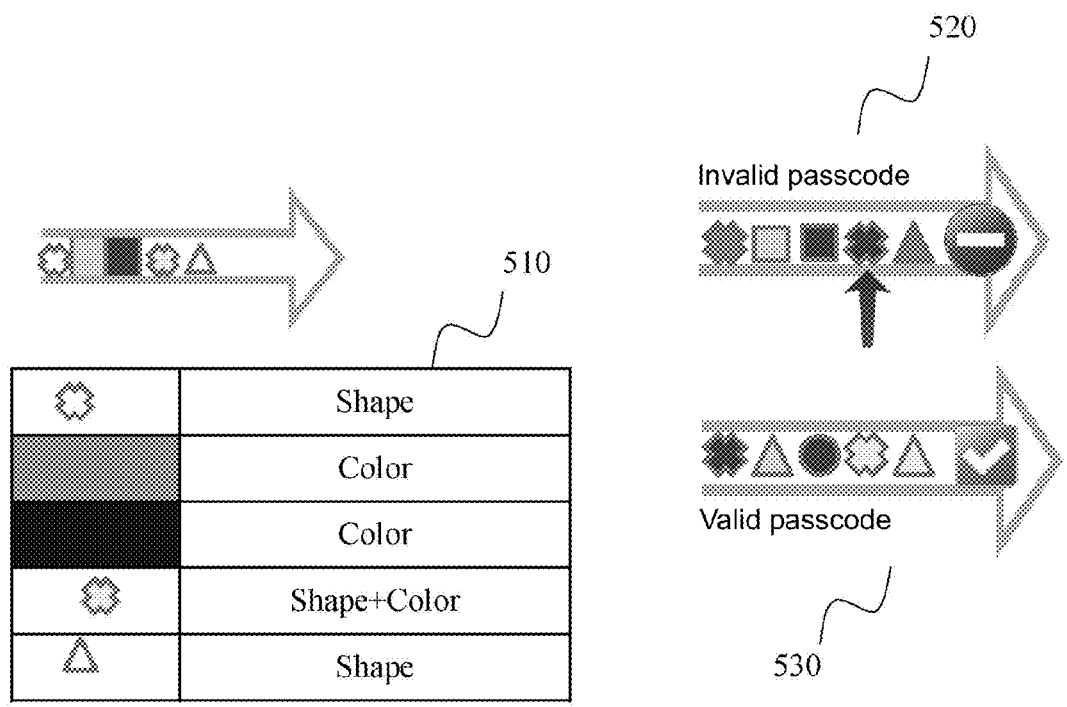

FIG. 3 is a flow chart of a method for the login of the password/challenge authentication process in the password-based challenge module according to a specific embodiment of the present invention. FIG. 5A and FIG. 5B are schematic views illustrative of the login to the computer system 104 in reference to FIG. 3 as described below.

Step 310: the computer system 104 responds to a user's login request.

Step 320: a login webpage 500 (shown in FIG. 5A) is sent. The login webpage 500 comprises icons "randomly" provided by the computer system 104 and characterized by various graphical attributes (such as color, hatching, and shape illustrated with FIGS. 4B, 5A), wherein the icons are associated with a set of grids and are sequentially selected in a client/server architecture by the users. The login webpage requires the user to enter a username. The login webpage comprises at least a webpage icons for selection. It is also practicable that icons associated with a set of grids are randomly provided for each digit of a password, so as to augment complexity. The grid-associated icons include any number of icons, and the present invention is not limited thereto. The mechanism for generating the icons randomly is effectuated by any conventional technique of random generation; for further details, refer to Random String Generator description for strings at the Webpage www.random.org.

Step 330: each digit of a password (or passcode) entered by the user is examined, according to recorded dimensional options for each digit of the password. Hence, step 330 entails examining and determining whether each icon choice entered by the user complies with restrictions of dimensional options preset for each digit entered by the user.

Step 340: It is determined whether the password entered by the user complies with restrictions of dimensional options preset for each digit entered by the user. The method goes to step 350 when the determination is negative, and goes to step 360 when the determination is affirmative.

Step 350: stay locked.

Step 360: unlock, thereby indicating that the login is done.

Referring to FIG. 4A, the registration webpage comprises dimensional options 400, finish button 402, and cancel button 404. According to embodiments of the present invention, dimensional options are not restricted to hatching 420, shape 430, and/or color 440 shown in FIG. 4B. The dimensional options include any other graphical attributes, such as grayscale and screen dot. Referring to FIG. 4B, each of the dimensional options available in the registration webpage is further divided and depicted in a particular option registration webpage 405. The particular option registration webpage 405 comprises particular option 410, previous button 412, next button 414, finish button 416, and cancel button 418. The particular option 410 includes hatching particular option 422, shape particular option 432, and color particular option 442 for selection by the user.

It is also practicable that the password-based challenge module described herein is implemented in a client/server architecture, wherein the registration webpage requires the user to enter a username.

FIG. 5B is a schematic view illustrative of the login to the computer system 104 in reference to FIG. 3. The schematic view of FIG. 5B shows a 5-digit password. Table 510 shows dimensional restrictions preset for each entered digit of a password by the user, for example, restricting digit 1 to shape ⬡ digits 2 and 3 to color, digit 4 to compliance ⬡ of both shape and color, and digit 5 to shape △. Password 520 and password 530 represent an invalid passcode and a valid passcode which result from the examination of the preset dimensional restrictions, respectively.

In a specific embodiment of the present invention, the registration process further includes a verification process. Like the login process, the verification process entails hinting at icons characterized by various graphical attributes, associated with a set of grids, and intended for sequential selection by the user, and entails examining each digit of a password (or passcode) entered by the user according to dimensional options of each digit of the recorded password.

Furthermore, the present invention is also applicable to a wide variety of information devices which are not Web-based, such as mobile phones, personal computers, notebook computers, and tablet computers. The information devices keep users' personal data and identity data, and thus can also provide single-machine application by means of a password-based challenge module of the present invention. The password-based challenge module can be a module in an application; however, in another embodiment, it can also be implemented as a program in another form, for example, being integrated into an operating system level and adapted to challenge a user when starting the operating system.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method for dynamically providing multi-dimensional password/challenge authentication, the method comprising:
    sending a login webpage in response to receipt of a login request, wherein the login webpage comprises a set of randomly generated icons each having a plurality of graphical attributes, the plurality of graphical attributes each corresponding to one of a plurality of dimensional options, and the icons are available for sequential selection;
    identifying, using a processor, a plurality of dimensional restrictions from the user, each specifying a group of preset dimensional options for each digit of a preset password, wherein, for each digit of the preset password, icons associated with a set of grids are randomly provided for selection; and
    determining, using a processor, whether the plurality of graphical attributes for each icon choice entered by a user complies with the group of preset dimensional options specified in a respective one of the plurality of dimensional restrictions for each digit of the preset password.

2. The method of claim 1, further comprising indicating a done login when the determining step yields an affirmative result.

3. The method of claim 1, wherein the login webpage comprises icons of at least a webpage for selection.

4. The method of claim 1, wherein the icons are provided in a grid.

5. The method of claim 1, wherein the graphical attributes comprise color, grayscale, hatching, screen dot, or shape.

6. The method of claim 1, wherein the icons comprise animal icons, fruit icons, number icons, or shape icons.

7. A method for providing registration of multi-dimensional password/challenge authentication, the method comprising:
    sending a registration webpage in response to receipt of a registration request, wherein the registration webpage comprises a plurality of dimensional options for each digit of a password to be preset by a user, each of the plurality of dimensional options specifying a respective graphical attribute of a respective digit, wherein, for each digit of the password, icons associated with a set of grids are randomly provided for selection; and
    recording, using a processor, a plurality of dimensional restrictions from the user each corresponding to a respective digit of the password to be preset by the user, wherein each of the plurality of dimensional restrictions specifies a group of preset dimensional options for each digit of the password.

8. The method of claim 7, wherein the graphical attributes comprise color, grayscale, hatching, screen dot, or shape.

9. The method of claim 7, wherein the icons comprise animal icons, fruit icons, number icons, or shape icons.

10. A computer system for dynamically providing multi-dimensional password/challenge authentication, the computer system comprising:
    a bus system;
    a memory connected to the bus system, wherein the memory comprises a set of instructions; and
    a processing unit connected to the bus system, wherein the processing unit executes the set of instructions to initiate operations comprising:
    sending a login webpage in response to receipt of a login request, wherein the login webpage comprises a set of randomly generated icons each having a plurality of graphical attributes, the plurality of graphical attributes each corresponding to one of a plurality of dimensional options, and the icons are available for sequential selection;
    identifying, using a processor, a plurality of dimensional restrictions from the user, each specifying a group of preset dimensional options for each digit of a preset password, wherein, for each digit of the preset password, icons associated with a set of grids are randomly provided for selection; and
    determining, using a processor, whether the plurality of graphical attributes for each icon choice entered by a user complies with the group of preset dimensional options specified in a respective one of the plurality of dimensional restrictions for each digit of the preset password.

11. The computer system of claim 10, wherein the processing unit further initiates an operation comprising indicating a done login when the determining step yields an affirmative result.

12. The computer system of claim 10, wherein the login webpage comprises icons of at least a webpage for selection.

13. The computer system of claim 10, wherein the icons are provided in a grid.

14. The computer system of claim 10, wherein the graphical attributes comprise color, grayscale, hatching, screen dot, or shape.

15. The computer system of claim 10, wherein the icons comprise animal icons, fruit icons, number icons, or shape icons.

* * * * *